United States Patent Office 2,731,959
Patented Jan. 24, 1956

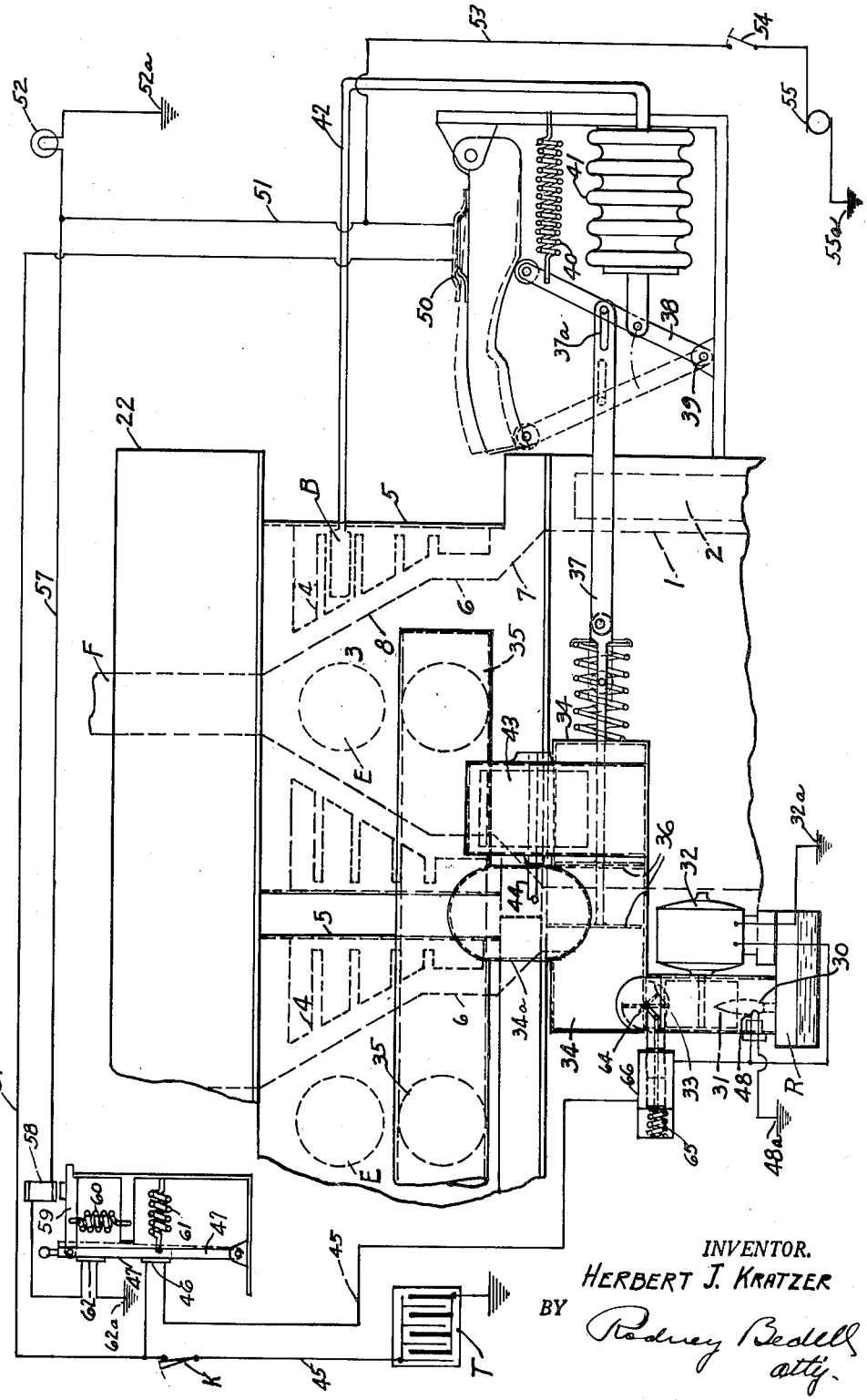

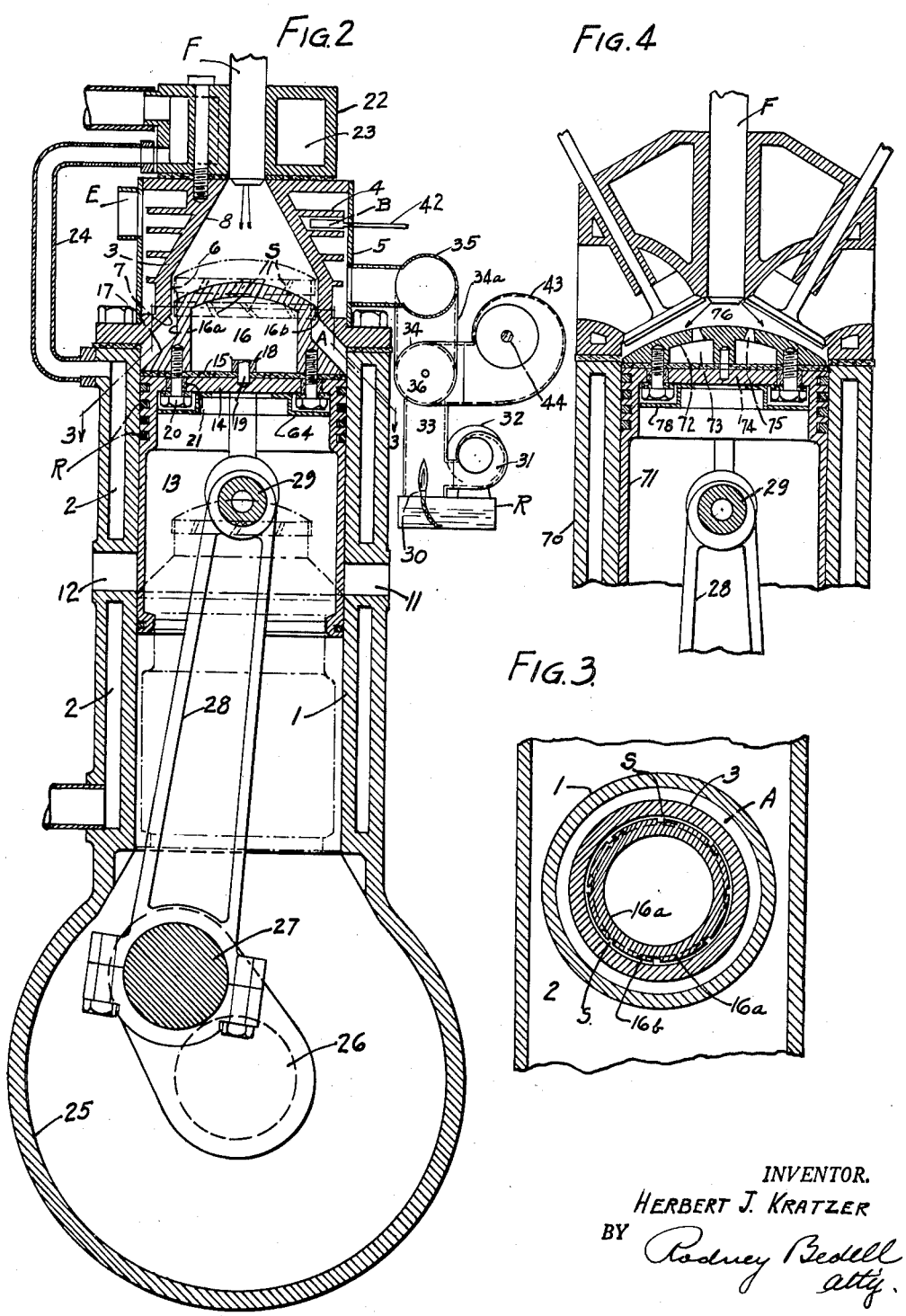
Jan. 24, 1956 — H. J. KRATZER — 2,731,959
INTERNAL COMBUSTION ENGINE
Filed Dec. 5, 1951 — 2 Sheets-Sheet 2

2,731,959

INTERNAL COMBUSTION ENGINE

Herbert J. Kratzer, St. Louis, Mo.

Application December 5, 1951, Serial No. 259,943

16 Claims. (Cl. 123—142.5)

The invention relates to internal combustion engines and consists in structure for controlling the thermal characteristics of the engine. The invention is particularly adapted for use in diesel type engine, although not limited to such application.

The main object of the invention is to maintain the major portion of the cylinder and piston at relatively low temperatures so that lubrication may be effective and at the same time to maintain the combustion chamber at relatively high temperatures so that combustion may be effective.

Another object is to promote combustion by increasing the turbulence of the fuel charge so that all particles of the charge may be subject to igniting temperatures.

Another object is to create and maintain a strong scrubbing turbulence in the burning charge during expansion strokes symmetrical about the axis of the cylinder bore and away from cylinder walls.

Another object is to facilitate the starting of diesel type engines without excessive use of starting motor.

Another object is to decrease heat pick-up by the piston body proper, thereby lowering its temperature and that of sealing rings to assure better cylinder bore lubrication, better ring sealing and to eliminate carbonized "stuck" rings.

Another object is to supply heat to new air charges after they have entered cylinder so that the subsequent compression-heating during compression strokes provides reliable and rapid ignition of injected fuel.

Another object is to provide for avoiding excessively high compression ratios, needed for starting during low temperature, thereby decreasing engine stresses and weight and increasing efficient engine service life.

Another object is to prevent fuel mist condensing on pistons which finally dilutes lubricating oil on cylinder wall and in crank case.

Another object is to increase combustion chamber turbulence immediately before fuel injection while retaining the simplicity and other advantages of an "open combustion chamber."

Another object is to control the temperature of the combustion chamber walls, by heating the same prior to starting the engine, and maintaining the combustion chamber walls, during normal operation of the engine, above the temperatures which would result from the usual unitary cooling system for the cylinders and combustion chamber.

More specifically, the invention comprises separate temperature control structures for the body of the cylinder wall and for the cylinder head, which, with the piston head, forms the combustion chamber.

In the accompanying drawings illustrating the invention,

Figure 1 is a diagram showing the upper portion of an engine cylinder and showing associated thermal control devices and electric circuits therefor.

Figure 2 is a vertical transverse section through one of the engine cylinders and the associated head and piston, showing the crank shaft, connecting rod and other structure relating to the temperature controls, as embodied in a two cycle type engine.

Figure 3 is a generally horizontal section taken on the line 3—3 of Figure 2.

Figure 4 is a corresponding section of the upper portion of a similar structure for a four cycle type engine.

The engine comprises a plurality of cylinder and piston assemblies arranged in line, each assembly corresponding to that detailed in Figure 2 and shown in part in Figure 1 and including a piston rod connection to a common crank shaft. Each cylinder body 1 includes a hollow jacket 2 for water or other cooling fluid. A cylinder head 3 is applied to the cylinder and is provided with radiating fins 4 which are surrounded by a jacket 5 for fluids to be used, before starting, for initial heating of the cylinder head and, during normal operation, for cooling of the cylinder head. In any event, the fluid in jacket 5 provides for temperature control of the cylinder head independently of the temperature control of the cylinder body effected by the fluid in jacket 2. Cylinder body 1 has an air inlet passage 11 and an outlet or relief passage 12. Preferably the several cylinder bodies are embodied in a single cylinder block and the heads similarly may constitute a single unit.

Cylinder head 3 forms part of the combustion chamber and its inner wall includes a cylindrical portion 6, of substantially smaller diameter than cylinder 1, a lower frustum 7 and an upper frustum 8.

The piston reciprocable in the cylinder includes a cylindrical body 13, a top wall 14, a gasket 15 and a head 16. The body is provided with the usual packing rings R. Piston head 16 includes a cylindrical portion 16a substantially smaller in diameter than the cylindrical portion 6 of the cylinder head. The piston head also includes a frustum 17 corresponding generally to the cylinder head frustum 7. Gasket 15 between piston top wall 14 and piston head 16 is constructed to afford substantial thermal insulation between them and extends throughout the area of wall 14 except for a centering pin 19 and securing bolts 20. The centering pin is seated in wall 14 and in a bridge 18 extending across the piston head. A thermal insulating washer and collar 21 surrounds each bolt 20.

The upper portion of the piston head has a band 16b of enlarged diameter with a minimum clearance to cylinder head wall portion 6. Spiral slots S are cut through this band to form passageways connecting the annulus A between the piston frustum 17 and the head frustum 7 with the combustion chamber above the piston head.

In operation, the initial upward movement of the piston traps the new air charge as the piston passes the air intake and exhaust ports 11, 12 and compresses the trapped air until, at approximately 40° of crank travel ahead of top dead center (T. D. C.), the enlarged band 16b, with spiral slots S, enters cylindrical head portion 16, thus dividing the new charge, now at considerable density, with the greater part of the charge being in the combustion chamber above the piston head. As the piston completes its upward stroke, piston frustum 17 approaches cylinder head frustum 7, and displaces the air in annulus A through slots S into the combustion chamber in spiral streams as the compression part of the cycle is completed and fuel is injected through valve F.

During approximately the first 40° of crank travel after T. D. C., piston head frustum 17 recedes from cylinder head frustum 7 with a resultant reversal of flow through slots S into annulus A and reversing the direction of whirl of the gas in the annulus. Thus, during most of the power stroke, the expanding burning gases above the piston have a scrubbing turbulence due to their core and peripheral strata rotating symmetrically about the cylinder axis in opposite directions and with minimum impingement on either piston or cylinder walls.

Mounted on cylinder head 3 is a hollow cap 22 of substantial depth and having an elongated central passage receiving a fuel injection valve F discharging into the upper end of the combustion chamber. Cap 22 provides a chamber 23 surrounding the injection valve and preferably connected by a conduit 24 with cylinder jacket 2. Hence, the temperature of valve F may be kept low enough to avoid undue vaporization of the fuel before it reaches the combustion chamber.

The engine includes a crank case 25, a crank shaft 26, having offset crank pins 27, and a connecting rod 28, with wrist pin connections 29 to the piston, as is customary in engines of this type.

The temperature controls of the cylinder body, cylinder head, or combustion chamber, and the cylinder head cap, include a burner 30 (Figure 1), supplied with fuel oil from a reservoir R and a blower 31 driven by a motor 32. A pipe 33 leads from burner 30 to one end of a horizontal conduit 34 having a connection 34a to a manifold 35, having outlets to jacket 5 associated with the cylinder heads and provided with exhausts E leading to the radiator (not shown).

A larger blower 43 is connected to the other end of conduit 34 and is driven direct from the engine by a drive shaft 44. A slide valve 36 in conduit 34 has a connection 37 to a lever 38 pivoted at 39 and actuated by a tension spring 40 and the Sylphon 41 of a thermostat connected by tubing 42 to a bulb B positioned in jacket 5.

To start the engine, the operator closes a master switch K (the handle of which also opens the fuel line, not shown) in a circuit 45 leading from battery T through a pair of contacts 46, which may be connected by manual operation of a switch blade 47, and energizes a glow wire 48, grounded at 48a, and ignites the burner fuel and also energizes blower motor 32, grounded at 32a.

The engine being cold, the liquid in thermostatic bulb B has low vapor pressure and tension spring 40 collapses Sylphon 41 to move lever 38 to the right as shown in full lines so that hot gases from burner 30 can be blown through pipe 33, conduit 34, pipe 34a and manifold 35 to each cylinder head jacket 5. As jacket 5 heats to approximately 300°, thermostatic bulb B heats accordingly and the increase in vapor pressure causes Sylphon 41 to expand against the tension of spring 40, and lever 38 moves to the left. After lost motion provided by slot 37a, is taken up, further movement of lever 38 to the left shifts valve 36 to connect blower 43 to conduit 34 and manifold 35, permitting cooling air to be circulated through jacket 5. Such movement of lever 38 closes switch 50 in a circuit 51 leading from switch K to a signal light 52 on the dash grounded at 52a. Switch 50 also closes a circuit 53 leading to a manual switch 54 for the starting motor 55 grounded at 55a.

When switch 50 is closed, it also completes a circuit 57 leading to a solenoid 58 which lifts a latch 59, pivoted on blade 47, against the tension of spring 60, and permits a spring 61 to pull switch blade 47 away from contacts 46, 62, thus opening the circuits for burner 30 and for solenoid 58.

At the instant engine is started, blower 43 starts delivering cooling air to manifold 35 but the volume is limited by valve 36 and the combustion chamber temperature will rise due to the thermal operation of the engine. As vapor pressure in thermostat bulb B increases, and Sylphon 41 urges lever 38 and valve 36 further to the left and more cooling air is delivered from blower 43 to manifold 35 until, at around 800° temperature, Sylphon 41 will have moved valve 36 to extreme left hand position. Thus, with a properly sized blower and cooling systems, the temperature of the combustion chamber will vary slightly above any desired temperature, with higher temperatures increasing air flow and lower temperatures decreasing air flow. During all times of engine operation at temperatures above 300°, switch 50 remains closed and the signal light on.

Preferably pipe 33 has a butterfly check valve 64 positioned horizontally by spring 65 to close the pipe. When contacts 46 and 62 are connected, a solenoid 66 is energized to swing valve 64 to vertical position and open pipe 33. When the field of solenoid 66 is released by opening of contacts 46 and 62, valve 64 closes pipe 33 and avoids leakage of cooling air from blower 43 through pipe 33. Lack of air to burner 30 will extinguish its flame.

Should the engine be stopped by opening master switch K, switch 50 remains closed as long as the temperature in jacket 5 remains above 300°, and the engine can be restarted by closing switch K and starter motor switch 54 without operating switch blade 47 and energizing the preliminary heating system.

Another arrangement for providing an increase in turbulence in the combustion chamber is shown in Figure 4, illustrating the valve arrangement of a four cycle engine. The cylinder body 70 and piston body 71 are substantially the same as previously described. The piston cap 72 is convex and provides a pocket 73 above the piston head top wall 74. Apertures 75 connect the combustion chamber 76 with pocket 73. Cap 72 is secured to the piston head top wall by bolts and is insulated from the piston as previously described.

During the compression stroke some of the air in the combustion chamber is forced through apertures 75 into pocket 73. This downward flow to the underside of the cap continues for a small time after fuel is supplied, but the flow is reversed as the subsequent downward travel of the piston expands the volume of the combustion chamber. After about 45° past T. D. C., the pressure in pocket 73 exceeds that above the cap, resulting in outgoing jets which creates a turbulence pattern avoiding impingement of burning gases on lubricated cylinder walls. This structure is particularly adaptable to a four cycle engine. Whether two cycle or four cycle engines are used, the insulated piston head functions to provide cylinder turbulence during expansion strokes which insulating the piston body from combustion chamber flame.

The structure provides separate temperature controls for the cylinder body, which surrounds the piston at all times, independent of the combustion chamber. This makes possible the maintenance of the comparatively low temperatures, which is desirable for maintaining lubricating oil in efficient condition and for maintaining comparatively high temperatures in the combustion chamber, which is desirable to effectively vaporize the fuel after injection and promote thorough combustion.

Shields 64 (Figure 2) and 78 (Figure 4) form closed air pockets around the heated heads of the piston head bolts and further protect the lubricating oil within the piston head body from being vaporized by the high temperature of the combustion chamber.

Variation in details may be made without departing from the spirit of the invention and the exclusive use of those modifications coming within the scope of the invention is contemplated.

What is claimed is:

1. In an internal combustion engine, a cylinder, a water circulating cooling system for the major portion of the cylinder, and an air circulating heating system for the upper end of the cylinder.

2. In an internal combustion engine, a plurality of cylinders each having a piston-receiving portion and an upper portion forming part of a combustion chamber, individual fluid-circulating structures for regulating the temperatures of the portions of each of said cylinders, and respective controls for said structures.

3. In an internal combustion engine, a cylinder, a cylinder head and piston assembly forming a combustion chamber, a structure for heating said combustion chamber independently of the cylinder prior to the starting of the engine, and thermostatic means for terminating the action of said structure during normal engine operation.

4. In an internal combustion engine, a cylinder body, a piston reciprocating therein, said cylinder having a head forming a part of a combustion chamber, and thermal insulation separating said cylinder body and head from direct contact with each other, and individual temperature control systems for the cylinder body and head.

5. In an internal combustion engine, a cylinder, a cylinder head, a fuel passage leading to the cylinder head, a common means controlling the temperature of the cylinder and fuel passage, and separate means controlling the temperatures of the cylinder head.

6. In an internal combustion engine, a cylinder, a cylinder head, a fuel passage leading to the cylinder head, a single fluid circulating system surrounding the cylinder and fuel passage, and a separate fluid circulating system surrounding the cylinder head.

7. In an internal combustion engine, a cylinder body, a cylinder head, a fuel passage leading to said head at the top of said head and spaced from said body, a common fluid circulating system surrounding the cylinder body and fuel passage, a separate fluid circulating system surrounding the cylinder head, there being thermal insulation between the cylinder body and the cylinder head and between the cylinder head and the fuel passage.

8. In an internal combustion engine having a cylinder body and a cylinder head, separate fluid jackets surrounding the body and head, a conduit leading to the cylinder head jacket, a battery initiated fuel burner, a flue leading from said burner to said conduit, an air passage leading to said conduit independently of said flue, a common valve controlling said flue and passage, and a thermostat associated with the cylinder head jacket and controlling the position of said valve.

9. In an internal combustion chamber, a cylinder head forming part of a combustion chamber, an air jacket for said head, a conduit leading to said jacket, spaced inlets to said conduit, a battery energized burner associated with one of said inlets, a valve from said inlets to said conduit, an electric circuit with a switch controlling the operation of said burner, and a thermostat in said jacket controlling the operation of said burner and the action of said switch.

10. In an internal combustion engine having a cylinder body and a cylinder head, individual heat control systems for the cylinder body and for the cylinder heads, a heater for the cylinder head system, a starter motor having an auxiliary circuit, and a thermostat associated with the cylinder head and controlling the starter motor circuit.

11. An internal combustion engine piston comprising a head with a top wall, a sheet of thermal insulation thereon, a convex cap mounted on said sheet and spaced from said head by said sheet and providing therewith a hollow pocket above said head, there being an aperture through said cap between said pocket and the exterior of the head.

12. In an internal combustion engine, a cylinder and a jacket therefor forming a fluid chamber, a cylinder head and a jacket therefor forming another fluid chamber, said chambers being closed to each other, and individual pump means for separately controlling the temperatures of the fluids in said two chambers.

13. In an internal combustion engine, a cylinder surrounded by a compartment for a temperature-controlling fluid, a piston in said cylinder, a combustion chamber above said cylinder surrounded by a compartment for a temperature controlling fluid and closed to said first compartment, an engine starting device including an electric circuit, and a thermostat control device positioned in said latter-mentioned compartment and closing said circuit only when the fluid in said latter-mentioned compartment is above a predetermined temperature.

14. In an internal combustion engine, a cylinder, separate compartments closed to the atmosphere and to each other for temperature-controlling fluids surrounding the upper and the lower portions of the cylinder, respectively, and means for circulating said fluids independently of each other and irrespective of their relative temperatures for effectively maintaining said fluids at substantially different temperatures during normal operation of the engine.

15. In an internal combustion engine, a cylinder, a cylinder head above the cylinder, there being thermal insulation between said cylinder and said cylinder head preventing metal to metal contact between them, a piston in said cylinder, a cap for said piston, there being thermal insulation between said piston and cap preventing metal to metal contact between them, and separate fluid circulating systems surrounding and controlling the temperature of said cylinder and said cylinder head, respectively.

16. Internal combustion engine structure as described in claim 15 in which retaining bolts secure the piston cap to the piston and include heads projecting into the interior of the piston, there being thermal-insulating shields over said bolt heads.

References Cited in the file of this patent

UNITED STATES PATENTS

| | | |
|---|---|---|
| 703,463 | Poole | July 1, 1902 |
| 895,466 | Johnston | Aug. 11, 1908 |
| 1,419,702 | Tartrais | June 13, 1922 |
| 1,609,449 | Williams | Dec. 7, 1926 |
| 1,774,881 | Fry | Sept. 2, 1930 |
| 1,977,752 | Baj | Oct. 23, 1934 |
| 2,137,231 | Asper | Nov. 22, 1938 |
| 2,142,210 | Rippingille | Jan. 3, 1939 |
| 2,190,394 | Birkigt | Feb. 13, 1940 |
| 2,400,977 | Clarkson | May 28, 1946 |
| 2,446,280 | Hancock | Aug. 3, 1948 |